United States Patent

[11] 3,588,130

| [72] | Inventors | John H. Fowler<br>Houston;<br>David P. Herd, Houston, Tex. |
|---|---|---|
| [21] | Appl. No. | 871,731 |
| [22] | Filed | July 25, 1969 |
| [45] | Patented | June 28, 1971 |
| [73] | Assignee | Rockwell Manufacturing Company<br>Houston, Tex.<br>Continuation of application Ser. No.<br>606,778, Jan. 3, 1967, now abandoned. |

[54] SEAL
12 Claims, 4 Drawing Figs.

[52] U.S. Cl. .................................................. 277/116.8,
277/166, 166/88
[51] Int. Cl. ...................................................... F16j 15/56,
E21b 33/08
[50] Field of Search ............................................. 277/116.2,
116.4, 116.6, 116.8, 166, 117; 285/146; 166/88,
89

[56] References Cited
UNITED STATES PATENTS

| 2,824,757 | 2/1958 | Rhodes ........................ | 285/146 |
| 2,934,363 | 4/1960 | Knox ........................... | 277/176 |
| 3,306,362 | 2/1967 | Urbanosky .................. | 277/116.2X |

Primary Examiner—Samuel B. Rothberg
Attorneys—Ned L. Conley and Murray Robinson

ABSTRACT: This specification discloses a sealing device especially designed to seal between concentric tubular members. The sealing device disclosed includes a pair of rigid retaining rings with a resilient packing member between them. Means are provided on the retaining rings for causing the edges of the resilient packing member to flow outwardly into engagement with the concentric tubular members when the retaining rings are forced toward each other. The specific embodiment illustrates the use of engaging arcuate surfaces on the retaining rings and the resilient member for this purpose.

PATENTED JUN28 1971

John H. Fowler
David P. Herd
INVENTORS

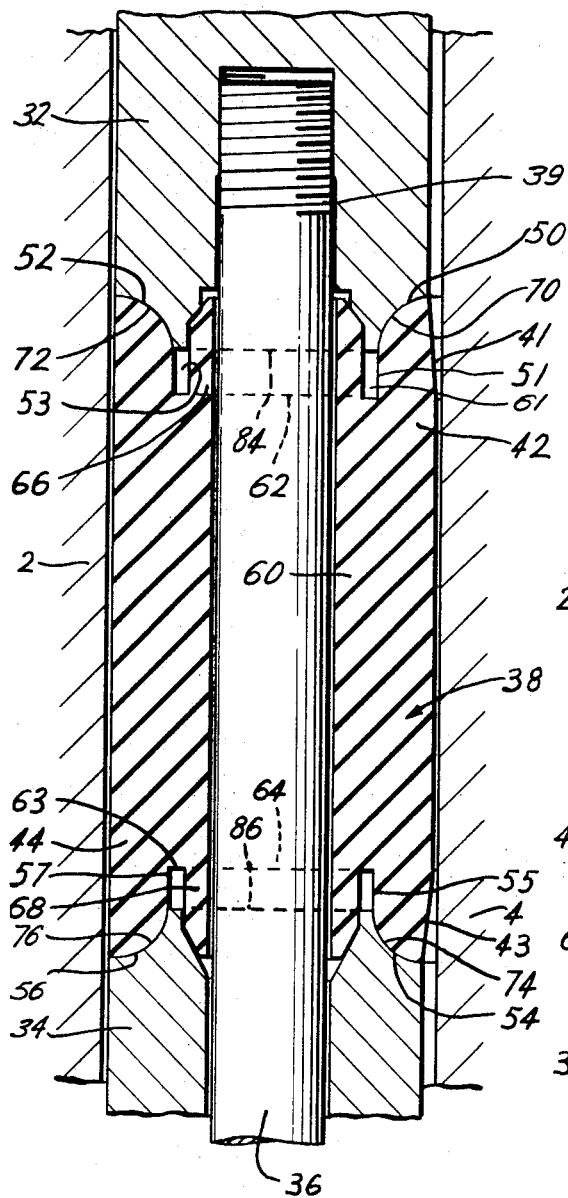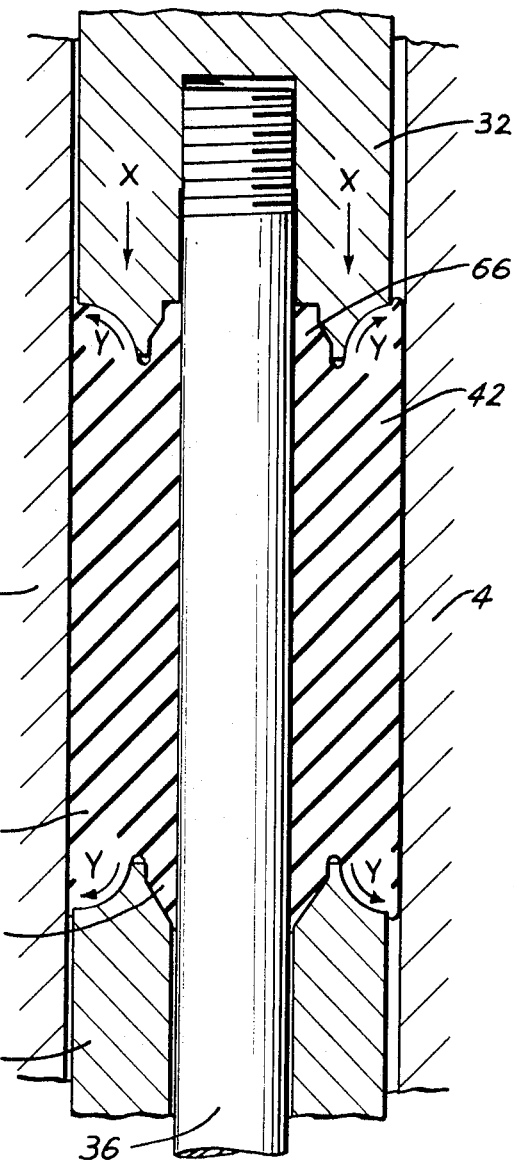

SEAL

This application is a continuation of application Ser. No. 606,778, filed Jan. 3, 1967, now abandoned.

This invention is related to fluid seals and more specifically to seals for sealing an annular space between two cylindrical surfaces.

It is often necessary to sealingly prevent flow through annular conduits. This is especially true in the petroleum industry, for example, in annular spaces between casings or between a casing and a casing head. It is desirable in underwater drilling operations to seal casing annuli to prevent foreign fluids from entering the well bore or to prevent loss of fluid from the well.

Most annular seals used in petroleum operations are dependent on suspended weights or variable force means to cause the seal to conform to the shape of the surfaces sealed thereby. One such variable force means is the lockscrew such as described in Rhodes U.S. Pat. No. 2,824,757, issued Apr. 4, 1955. The lockscrew has a conical tip which increases the deformation force as the tip is increasingly brought to bear against a force transmitting element such as a retainer ring. The ordinary annular seal requires relatively large weights or forces to effect the seal. In underwater wellheads, such as those used in extended casing operations, the annular seal may be dependent on the supported weight of risers between the wellhead and platform. This weight may not be sufficient to fully seal the annular seals presently in use. The present invention is capable of sealing with relatively much less weight than ordinarily required.

Rubber or similar compounds are generally used as sealing elements. Rubber is not compressible, but will cold flow easily and has a very good "memory." After being deformed it will easily return to its original shape when the constraining force is removed. In neither the suspended weight or variable force means used in annular seals is the deformation force to be applied precisely predictable. Since rubber obeys Paschal's Law, i.e., forces are transmitted equally in all directions, excessive forces may be applied causing "bottlenecking" of tubular elements sealed thereby. The present invention provides a seal which may be sealed with precisely predictable forces of relatively small amounts so that "bottlenecking" is not possible.

The inner and outer faces of most annular seals are parallel to the surfaces against which they seal. Usually annular seals are designed with small clearances between the seal and surfaces to be sealed before deformation. Many times on introduction of the seal, there is a tendency for it to act as a brake band as the seal is lowered into place. This is not a great problem in surface wells, since the wellhead and seal location are fairly accessible. However, in underwater wells where control of entry is remote to the seal location, this tendency to "brake" may cause difficult installation problems if all elements involved are not in perfect alignment. The present invention is designed to reduce these problems.

Another problem of presently used annular seals arises in the connection means used to attach the resilient sealing element to force transmitting retainer rings. Screws passing through the sealing element must fit loosely enough to allow sliding yet tightly enough to prevent leakage. Although forces may be sufficient to seal the faces of a seal they may not be sufficient to prevent leakage by the connection means. The present invention presents a solution to this problem also.

The present invention is basically an annular resilient member sandwiched between retainer rings. As will be seen, however, the resilient member or seal has a novel configuration to facilitate easy installation with relatively small deformation forces. An arrangement for positively determining deformation force is also presented.

It is, therefore, a primary object of the invention to provide an annular seal which may provide effective sealing with relatively small deformation forces.

Another object of the invention is to provide an annular seal which may be remotely installed with ease and very little likelihood of premature frictional interference with the surfaces to be sealed.

Still another object of the invention is to provide an annular seal which may be easily installed and deformed by a predetermined amount to assure efficient sealing without the possibility of excessive deformation forces.

Still another object of the invention is to provide an annular seal which employs leak free connection means between the sealing element and deformation transmitting elements.

Preferred embodiments of the subject invention by which the foregoing objects and other objects are attained are shown in the accompanying drawings and in the following description. For a better understanding of the invention reference is now made to the accompanying drawings wherein:

FIG. 2 is a detailed cross section of a portion of the invention prior to sealing engagement with hanger-heads;

FIG. 3 is a detailed cross section of the same portion of the invention as shown in FIG. 2 after sealing engagement with hanger-heads;

Figure 1:
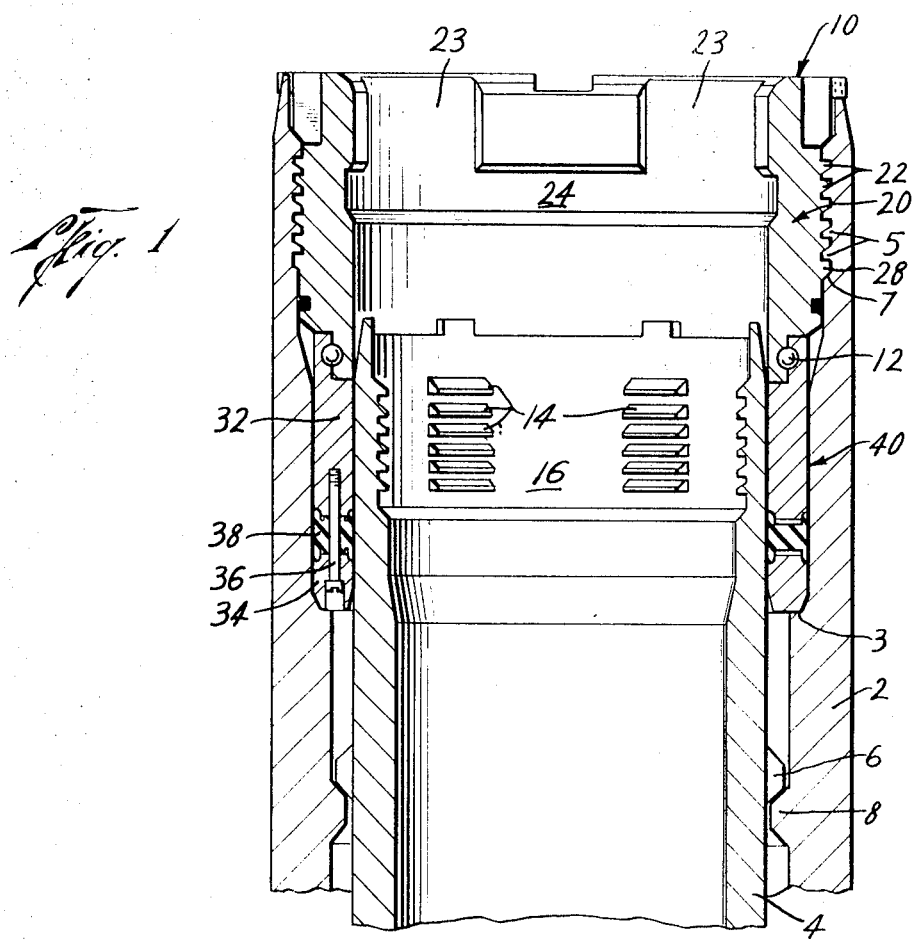
FIG. 1 is an elevation in cross section of the invention employed in an annular packoff between two hanger-heads.

Referring first to FIG. 1, a packoff 10 employing the annular seal indicated generally at 40 is shown installed in the annular space between nested hanger-heads 2 and 4 in an underwater wellhead. Hanger-head 4 may be supported by lug 6 resting on shoulder 8 within hanger-head 2. Any other means of support may be used which allows passage of fluid for cementing requirements. Attached to each hanger-head is a suspended pipe string (not shown).

In addition to annular seal 40, packoff 10 includes holddown section 20. Holddown section 20 is a hollow cylinder with alternate rows of tooth segments 22 and smooth wall segments machined on its exterior to cooperate with corresponding rows of tooth segments 5 and smooth wall segments on the interior of hanger-head 2. These tooth segments and smooth wall segments are similar to those shown at 14 and 16 within hanger-head 4. The interior of section 20 is provided with tool slots 23 and circumferential tool groove 24 to provide a "J" slot connection for a setting tool. With the tool attached, packoff 10 may be inserted in the annular space between hanger-heads 2 and 4 with tooth segments 22 in the smooth wall segments of hanger-head 2. Holddown section 20 is then rotated until tooth segments 22 are completely engaged with cooperating tooth segments 5 on the interior of hanger-head 2. This provides a locking device similar to breech-blocks of artillery pieces. Holddown section 20 is attached to annular seal 40 by a telescopic joint and ball bearings 12 inserted in a ball race formed by adjacent semicircular grooves on section 20 and annular seal 40 within the telescopic joint. This allows annular seal 40 to remain stationary when section 20 is rotated. This method of holding down annular seals is more fully described in our U.S. Pat. No. 3,421,580. Many other methods may be used to holddown annular seal 40, the one described simply being used for illustration. Since tooth segments 5 and shoulder 3 on the interior of hanger-head 2 are a predetermined distance apart, the deformation forces applied to annular seal 40 are also predetermined. Thus, the required sealing forces may be applied without the possibility of excessive forces which would cause "bottlenecking."

Annular seal 40 comprises an annular upper retainer ring 32, an annular lower retainer ring 34, a resilient sealing ring 38 therebetween, and connection means comprising a plurality of capscrews 36 whose heads are countersunk in the lower end of retainer ring 34. The cooperating surfaces of retainer rings 32, 34 and sealing ring 38 are very important and will be described later in detail. Suffice it to say at the present, that as packoff 10 is lowered into place, lower retainer ring 34 contacts upwardly facing flat shoulder 3 on the interior of hanger-head 2. On further downward movement upper ring 32 transmits deformation force to seal ring 40 causing it to flow into sealing engagement with the interior of hanger-head 2 and exterior of hanger-head 4.

As previously stated, the configuration of retainer ring 32 and 34 and sealing ring 38 are important and will now be described with reference to FIGS. 2 and 3 which are detailed cross sections of a portion of annular seal 40 of FIG. 1. Sealing ring 38 is shown between upper retainer ring 32 and lower retainer ring 34. Capscrew 36 is connected to upper retainer ring 32 at threads 39. Sealing ring 38 and lower retainer ring 34 may slid on screw 36. Some designs may not require attachment means, in which case sealing ring 38 would simply be freely placed between retainer rings 32 and 34.

Before deformation sealing ring 38 would appear as shown in FIG. 2. The faces of sealing ring 38 are defined by an arcuate inner flange portion 42 and arcuate outer flange portion 44. Flange portions 42 and 44 are joined by body portion 60 which has upwardly facing and downwardly facing arcuate flat surfaces 62 and 64 interrupted only by raised bosses 66 and 68 around holes provided in the body 60 of sealing ring 38 for capscrews 36. If there were no connection means the bosses and holes would be eliminated. The face of outer flange 44 is cylindrical in shape. The face of inner flange 42 is generally cylindrical except at its upper and lower edges where frustoconical surfaces 41 and 43 may be provided. Surfaces 41 and 43 prevent sealing ring 38 from catching on any object or acting as a brake band when the annular seal is lowered into place between hanger-heads 2 and 4 or when it is removed. The design of the lips also helps prevent this. This is particularly important if all components of the well are not perfectly concentric. The inner lips of flanges 42 and 44 are formed by the generation of a quarter-circle about the axis of sealing ring 38 to give arcuate surfaces 50, 52, 54 and 56 intersecting the faces of flanges 42 and 44 perpendicular thereto. These surfaces are joined to body 60 by cylindrical bands 51, 53, 55, and 57. The lower edge of ring 32 and the upper edge of ring 34 are provided with quarter-circle generated surfaces 70, 72, 74, and 76 to cooperate with surfaces 50, 52, 54 and 56 of sealing ring 38. Surfaces 50, 52, 54 and 56 are joined by flat edges 84 and 86 interrupted only by countersunk frustoconical holes to cooperate with bosses 66 and 68 of sealing ring 38. Void spaces 61 and 63 are thus left between the flat edges of retainer rings 32, 34 and sealing ring 38.

In operation the packoff 10 in FIG. 1 is lowered into the annular space between hanger-heads 2 and 4 attached to a pipe string and a setting tool. Due to frustoconical surfaces 41 and 43 of sealing ring 38 and the lip design of flanges 42 and 44, minimum frictional drag will hinder the installation of packoff 10. Since the surfaces 50, 52, 54, and 56 intersect the faces of inner and outer flanges 42 and 44 substantially perpendicular thereto any small force applied to the seal as it is lowered will not prematurely wedge the lips into engagement. The packoff will continue downward until lower retainer ring 34 contacts shoulder 3 in hanger-head 2. Now referring to FIG. 3, lower retainer ring 34 remains stationary as upper ring 32 is forced downwardly by the weight of the above attached pipe string. As ring 32 moves downwardly, as shown by arrows X, the lips of sealing ring flanges 42 and 44 first roll outwardly as indicated by arrows Y, due to the cooperation of the adjacent surfaces of retainer rings 32 and 34 and sealing ring 38. This gives a quick initial seal. On further downward movement of ring 32 sealing ring 38 cold flows into the voids between sealing ring 38 and hanger-heads 2 and 4 effectively sealing on both of its faces. Bosses 66 and 68 also cold flow into the voids around the countersunk holes provided for capscrew 36 thereby sealing around the connection. The downward movement of retainer ring 32 is limited to a predetermined amount by means such as the lower flank of tooth slot 7 in FIG. 1 which is a continuous shoulder within hanger-head 2. The packoff is latched or locked down at this point assuring effective sealing without the possibility of excessive forces. Actual tests have shown that the seal of this invention requires as little as one quarter of the compression force required to seal conventionally used "sandwich" type annular seals.

To remove packoff 10, it is first unlocked. Sealing ring 38 returns to its nondeformed shape as the deformation forces are reduced. The packoff is then removed with a minimum of friction drag.

Figure 4:
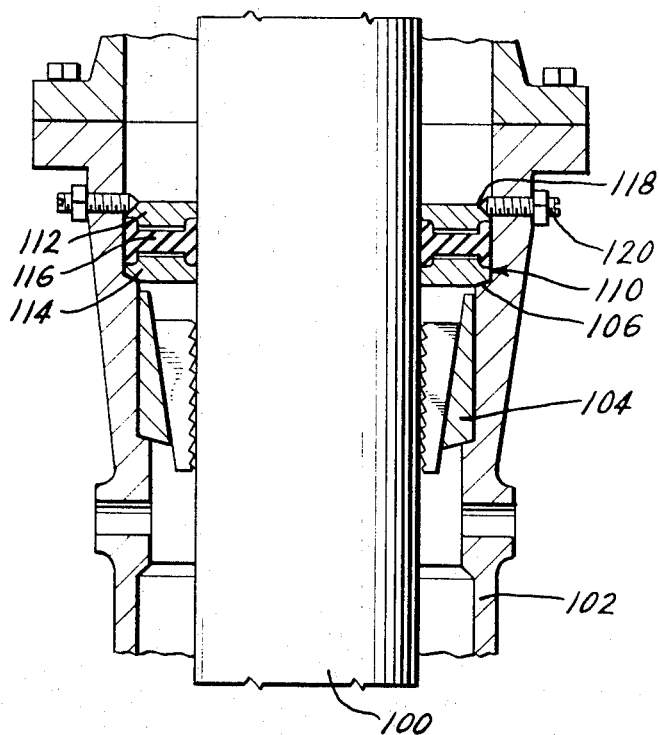
FIG. 4 is an elevation in cross section of another embodiment of the invention employed in sealing the annular space between a casing head and its supported casing.

This type seal is very versatile and may be used in many ways. Another embodiment is shown in FIG. 4 which shows a casing 100 supported in a conventional wellhead 102 by conventional slip hanger 104. Above slip hanger 104 annular seal 110 is seated on a shoulder 106. Annular seal 110 comprises upper retainer ring 112, lower retainer ring 114 and resilient sealing ring 116 therebetween. The cooperating surfaces of rings 112 and 114 and sealing ring 116 are similar to those described in FIG. 2. Upper ring 112 is beveled on its upper edge to provide a surface 118 to cooperate with lockscrews 120 which may be turned to apply compression force to sealing ring 116. Sealing ring 116 seals in the same manner as sealing ring 38 in FIG. 2, and also requires much less compression force than conventional "sandwich" type annular seals.

While two preferred embodiments of the invention have been shown and described, many modifications thereof can be made by one skilled in the art without departing from the spirit of the invention, and it is intended to cover by Letters Patent all forms of the invention falling within the scope of the following claims:

We claim:

1. Annular sealing apparatus comprising
   first annular retainer ring,
   second annular retainer ring, and
   resilient annular sealing ring between said first and second retainer rings, said sealing ring having outer and inner arcuate flange portions joined by a body portion, the lips of said flange portions being partially defined by convexly arcuate surfaces intersecting the face of said flange portions substantially perpendicular thereto, the edges of said first and second retainer rings adjacent to said resilient sealing ring being partially defined by concavely arcuate surfaces, said edges to cooperate with the lips of said sealing ring flange portions when said retainer rings are brought together to first roll said lips outwardly therefrom and then to further deform said resilient seal by compressing said seal ring longitudinally while it expands laterally.

2. The combination of claim 1 in which the inner and outer faces of said sealing ring are generally cylindrical in shape, at least one of said faces being joined to said lips of said flange portion by frustoconical surfaces having their axes coincident with the axis of said sealing ring, and converging in a direction so that the radial thickness of said seal from inner flange lip to outer flange lip is less than from inner flange face to outer flange face.

3. The combination of claim 1 and holddown means connected to one of said retainer rings by a telescopic joint and ball bearings inserted in a ball race formed by adjacent semicircular grooves on said holddown means and one of said retainer rings within said telescopic joint.

4. The combination of claim 1 in which the inner and outer faces of said sealing ring are generally cylindrical in shape, at least one of said faces being joined to said lips of said flange portion by tapered surfaces so that the radial thickness of said sealing ring at said lips is less than its radial thickness at said body portion.

5. Annular sealing apparatus as set forth in claim 1; characterized in that the cross-sectional radius of said concavely arcuate surfaces is no greater than the cross-sectional radius of said convexly arcuate surfaces, the height of said lips being such as to leave voids between said retainer rings and said body portion of said sealing ring, said voids to allow said retainer rings to move together to first cause said lips to roll outwardly to sealingly engage the walls of an annular passage, then to cause the entire face of said flange portions to sealingly engage said annular passage walls.

6. Annular sealing apparatus as set forth in claim 1; characterized in that said convexly arcuate surfaces are formed by the generation of a quarter-circle about the axis of said sealing ring.

7. Annular sealing apparatus comprising: annular seal means and tubular holddown means, said annular seal means comprising first annular retainer ring, second annular retainer ring and resilient annular sealing ring between said first and second retainer ring; characterized in that said seal ring comprises outer and inner arcuate flange portions joined by a body portion, said flange portions having arcuate lip portions and generally cylindrical faces, at least one of said faces being joined to the lip portion of its respective flange portion by tapered surfaces so that the radial thickness of said seal ring at said lips is less than its radial thickness at said body portion.

8. Annular sealing apparatus comprising: annular seal means and tubular holddown means, said annular seal means comprising first annular retainer ring, second annular retainer ring and resilient annular sealing rings; characterized in that said annular seal means is rotatably connected to said tubular holddown means by a telescopic joint and ball bearings inserted in a ball race formed by adjacent semicircular grooves on said holddown means and said annular seal means within said telescopic joint.

9. Annular sealing apparatus concentrically positioned in an annular space between two cylindrical surfaces, comprising: annular seal means rotatably connected to tubular holddown means and having first annular retainer ring, second annular retainer ring and resilient annular sealing ring between said retainer rings; characterized by stop means in said annular space and holddown connection means affixed to one of said cylindrical surfaces at a fixed distance from said stop means, said annular seal means engaging said stop means and said holddown means engaging said connection means placing a predetermined deformation force on said sealing ring.

10. Annular sealing apparatus as set forth in claim 9, characterized in that said resilient sealing ring comprises outer and inner arcuate flange portions joined by a body portion, the lips of said flanged portion being partially defined by convexly arcuate surfaces and the edges of said first and second retainer rings adjacent to said resilient sealing ring being partially defined by concavely arcuate surfaces, said edges to cooperate with the lips of said sealing ring flange portions when said retainer rings are brought together to first roll said lips outwardly and then to further deform said resilient seal by compressing said seal longitudinally while it expands laterally.

11. Annular sealing apparatus comprising: first annular retainer ring; second annular retainer ring, and resilient annular sealing ring slidably retained between said first and second retainer rings by a plurality of screws passing through screw holes in a body portion of said sealing ring, said sealing ring having outer and inner arcuate flange portions joined by said body portion, the lips of said flange portions being partially defined by convexly arcuate surfaces, the edges of said first and second retainer rings adjacent to said resilient sealing ring being partially defined by concavely arcuate surfaces, said edges to cooperate with the lips of said sealing ring flange portions when said retainer rings are brought together to first roll said lips outwardly therefrom and then to further deform said resilient seal by compressing said seal ring longitudinally while it expands laterally and sealingly engages said screws; characterized in that the edges of said retainer rings adjacent said sealing ring are provided with frustoconical countersunk holes around said screws and the edges of said sealing ring are provided with raised bosses around said screw holes, said bosses being deformed by the moving together of said retainer rings to sealingly engage said screws within said countersunk holes in said retainer rings.

12. Annular sealing apparatus as set forth in claim 11; characterized in that said screws are stationarily affixed to one of said retainer rings, the other of said retainer rings slidably mounted on said screws for limited longitudinal movement relative thereto.